US011453106B2

(12) United States Patent
Kelly

(10) Patent No.: US 11,453,106 B2
(45) Date of Patent: Sep. 27, 2022

(54) ROTARY POWER TOOL HAVING WORK LIGHT BRIGHTNESS CONTROL UNIT

(71) Applicant: MILWAUKEE ELECTRIC TOOL CORPORATION, Brookfield, WI (US)

(72) Inventor: Mark W. Kelly, Wauwatosa, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 180 days.

(21) Appl. No.: 17/076,952

(22) Filed: Oct. 22, 2020

(65) Prior Publication Data

US 2021/0122017 A1    Apr. 29, 2021

Related U.S. Application Data

(60) Provisional application No. 62/926,074, filed on Oct. 25, 2019.

(51) Int. Cl.
*H05B 47/16* (2020.01)
*B25F 5/02* (2006.01)
*F21V 23/04* (2006.01)
*B25B 23/18* (2006.01)
*B25B 21/02* (2006.01)

(52) U.S. Cl.
CPC ............. *B25B 23/18* (2013.01); *B25F 5/02* (2013.01); *F21V 23/04* (2013.01); *H05B 47/16* (2020.01); *B25B 21/02* (2013.01)

(58) Field of Classification Search
CPC . B25B 23/18; B25B 21/02; B25F 5/02; F21V 23/04; H05B 47/10; H05B 47/16
See application file for complete search history.

(56) References Cited

U.S. PATENT DOCUMENTS

| 6,494,590 | B1 | 12/2002 | Paganini et al. |
| 8,317,350 | B2 | 11/2012 | Friedman et al. |
| 8,328,381 | B2 | 12/2012 | Dixon et al. |
| 8,446,120 | B2 | 5/2013 | Forster et al. |
| 8,506,108 | B2 | 8/2013 | Friedman et al. |
| 8,653,787 | B2 | 2/2014 | Cunanan et al. |

(Continued)

FOREIGN PATENT DOCUMENTS

| CN | 106475977 A | 3/2017 |
| CN | 110087217 A | 8/2019 |

(Continued)

OTHER PUBLICATIONS

Makita, "Cordless Impact Driver," Instruction Manual publicly available at least as early as Jun. 20, 2018 (28 pages).

*Primary Examiner* — Jimmy T Vu
(74) *Attorney, Agent, or Firm* — Michael Best & Friedrich LLP

(57) ABSTRACT

A rotary power tool includes a housing having a motor housing portion and a handle extending from the housing. An electric motor is disposed within the motor housing portion. The rotary power tool further includes a trigger switch configured to activate and deactivate the motor, a plurality of lighting elements configured to be activated in response to actuation of the trigger switch, and a brightness control unit positioned on the housing. The brightness control unit is configured to adjust the lighting elements between a plurality of different brightness states other than an "ON" state or an "OFF" state.

15 Claims, 4 Drawing Sheets

(56) References Cited

U.S. PATENT DOCUMENTS

| | | |
|---|---|---|
| 8,796,995 B2 | 8/2014 | Cunanan et al. |
| 8,820,955 B2 | 9/2014 | Dixon et al. |
| 8,827,483 B2 | 9/2014 | Dixon et al. |
| 8,981,680 B2 | 3/2015 | Suda et al. |
| 8,988,015 B2 | 3/2015 | Forster et al. |
| 9,000,882 B2 | 4/2015 | Velderman et al. |
| 9,028,088 B2 | 5/2015 | Vanko et al. |
| 9,071,069 B2 | 6/2015 | Brotto et al. |
| 9,114,494 B1 | 8/2015 | Mah |
| 9,209,642 B2 | 12/2015 | Cunanan et al. |
| 9,225,275 B2 | 12/2015 | Sterling et al. |
| 9,328,915 B2 | 5/2016 | Vanko et al. |
| 9,352,458 B2 | 5/2016 | Friedman et al. |
| 9,401,250 B2 | 7/2016 | Velderman et al. |
| 9,406,457 B2 | 8/2016 | Velderman et al. |
| 9,413,088 B2 | 8/2016 | Brotto et al. |
| 9,444,269 B2 | 9/2016 | Wohltmann et al. |
| 9,458,996 B2 | 10/2016 | Francis et al. |
| 9,461,379 B2 | 10/2016 | Cunanan et al. |
| 9,508,498 B2 | 11/2016 | Forster et al. |
| 9,570,822 B2 | 2/2017 | Cunanan et al. |
| 9,573,257 B2 | 2/2017 | Kynast et al. |
| 9,644,837 B2 | 5/2017 | Vanko et al. |
| 9,692,157 B2 | 6/2017 | Brotto et al. |
| 9,722,334 B2 * | 8/2017 | Sterling .................. B25F 5/00 |
| 9,960,509 B2 | 5/2018 | Sterling et al. |
| 9,966,774 B2 | 5/2018 | Wohltmann et al. |
| 10,027,140 B2 | 7/2018 | Cunanan et al. |
| 10,052,733 B2 | 8/2018 | Ely et al. |
| 10,094,545 B2 | 10/2018 | Francis et al. |
| 10,256,697 B2 | 4/2019 | Velderman et al. |
| 2002/0105794 A1 | 8/2002 | Hanscom et al. |
| 2002/0105796 A1 | 8/2002 | Naghi et al. |
| 2002/0105797 A1 | 8/2002 | Navid et al. |
| 2009/0309519 A1 * | 12/2009 | Suzuki .................. B25F 5/021 315/314 |
| 2011/0058356 A1 | 3/2011 | Friedman et al. |
| 2013/0063051 A1 * | 3/2013 | Sterling ................ H05B 47/16 315/360 |
| 2014/0232326 A1 | 8/2014 | Wohltmann et al. |
| 2017/0047819 A1 | 2/2017 | Forster et al. |
| 2017/0203421 A1 | 7/2017 | Vanko et al. |
| 2018/0226819 A1 | 8/2018 | Wohltmann et al. |
| 2018/0323625 A1 | 11/2018 | Cunanan et al. |
| 2019/0001457 A1 | 1/2019 | Ely et al. |

FOREIGN PATENT DOCUMENTS

| | | |
|---|---|---|
| DE | 20215381 U1 | 3/2003 |
| DE | 20215382 U1 | 3/2003 |
| DE | 10256804 A1 | 6/2004 |
| DE | 102012219177 A1 | 4/2014 |
| WO | 2009008428 A1 | 1/2009 |

* cited by examiner

ROTARY POWER TOOL HAVING WORK LIGHT BRIGHTNESS CONTROL UNIT

CROSS-REFERENCE TO RELATED APPLICATIONS

This application claims priority to U.S. Provisional Patent Application 62/926,074 filed on Oct. 25, 2019, the entire content of which is incorporated herein by reference.

FIELD OF THE INVENTION

The present invention relates to rotary power tools, and more particularly to rotary power tools having work lights.

BACKGROUND OF THE INVENTION

Rotary power tools typically include an onboard work light for illuminating a work area where the tool is being used. Such work lights are usually activated concurrently with the motor of the rotary power tool and in response to the motor trigger being depressed. In this manner, activation of the motor and the work light is coordinated at the beginning of a drilling or fastening operation for which the tool is being used. Deactivation of the work light can be coordinated with the motor trigger being released, or a timer can be used to delay deactivation of the work light after a predetermined amount of time following release of the motor trigger.

SUMMARY OF THE INVENTION

The present invention provides, in one aspect, a rotary power tool including a housing having a motor housing portion and a handle extending from the housing. An electric motor is disposed within the motor housing portion. The rotary power tool further includes a trigger switch configured to activate and deactivate the motor, a plurality of lighting elements configured to be activated in response to actuation of the trigger switch, and a brightness control unit positioned on the housing. The brightness control unit is configured to adjust the lighting elements between a plurality of different brightness states other than an "ON" state or an "OFF" state.

The present invention provides, in another aspect, a rotary power tool including a housing having a motor housing portion and a handle portion extending from the housing, an electric motor disposed within the motor housing portion, a trigger switch configured to selectively activate the electric motor, a plurality of lighting elements, and a controller positioned in the housing and configured to activate the lighting elements in response to actuation of the trigger switch. The rotary power tool also includes a control unit positioned on the housing. The control unit includes a light switch in electrical communication with the controller and a timer configured to be adjusted by the light switch to a plurality of different expiration times after which the lighting elements are deactivated following release of the trigger switch.

The present invention provides, in another aspect, a rotary power tool including a housing having a motor housing portion and a handle portion extending from the housing, an electric motor disposed within the motor housing portion, an output shaft extending from the housing configured to receive torque from the electric motor, causing the output shaft to rotate, a trigger switch configured to selectively activate the electric motor, a plurality of lighting elements radially positioned around the output shaft, and a controller positioned in the housing and configured to activate the lighting elements in response to actuation of the trigger switch. The rotary power tool also includes a brightness control unit positioned on the housing. The brightness control unit is configured to adjust the lighting elements between a plurality of different brightness states other than an "ON" and an "OFF" state separately from the actuation of the trigger switch. The housing includes a foot portion on an opposite end of the handle portion as the motor housing portion. And, the brightness control unit is positioned on the foot portion of the housing.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
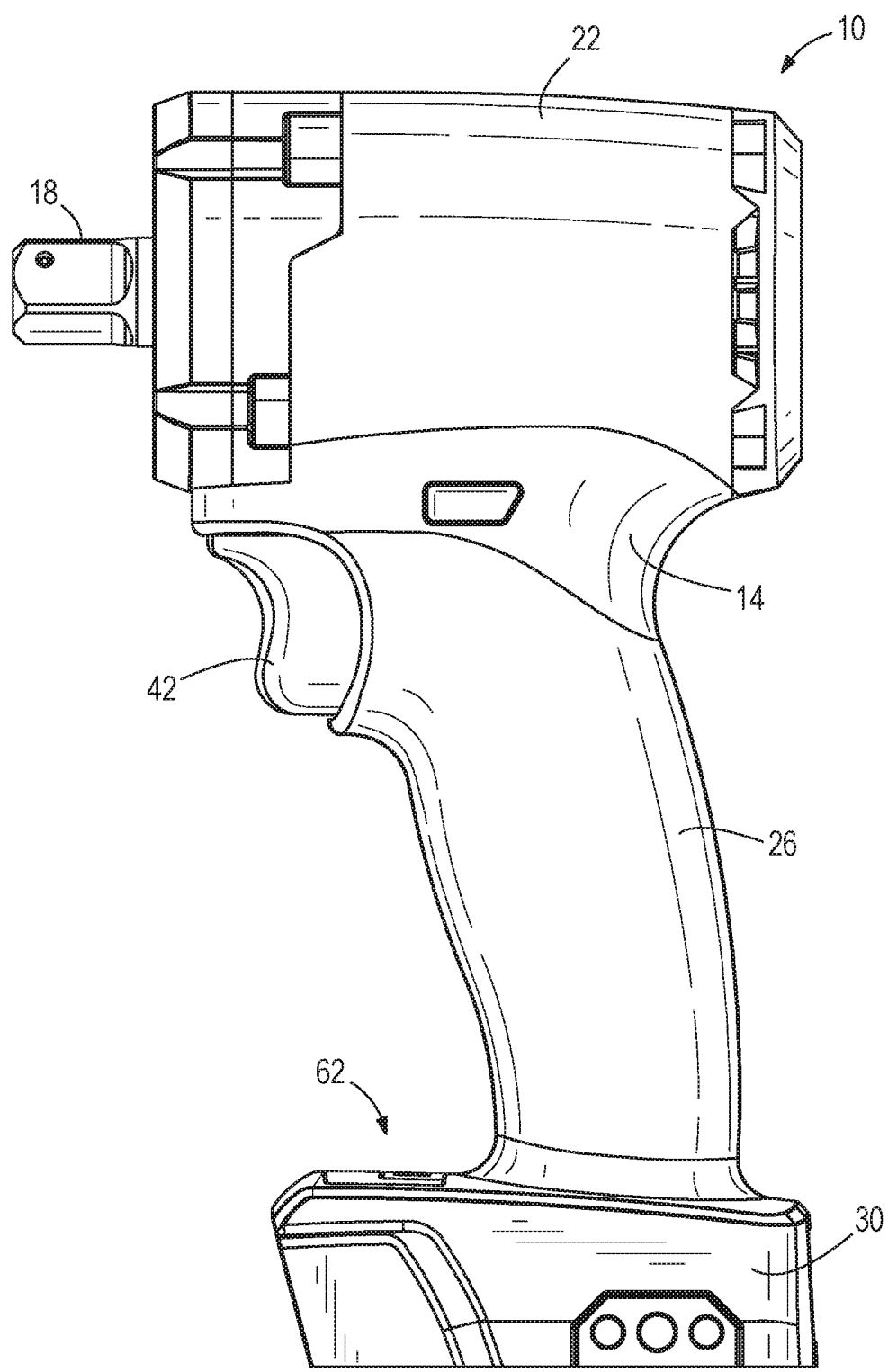
FIG. 1 is a side view of a rotary power tool in accordance with an embodiment of the invention.
Figure 2:
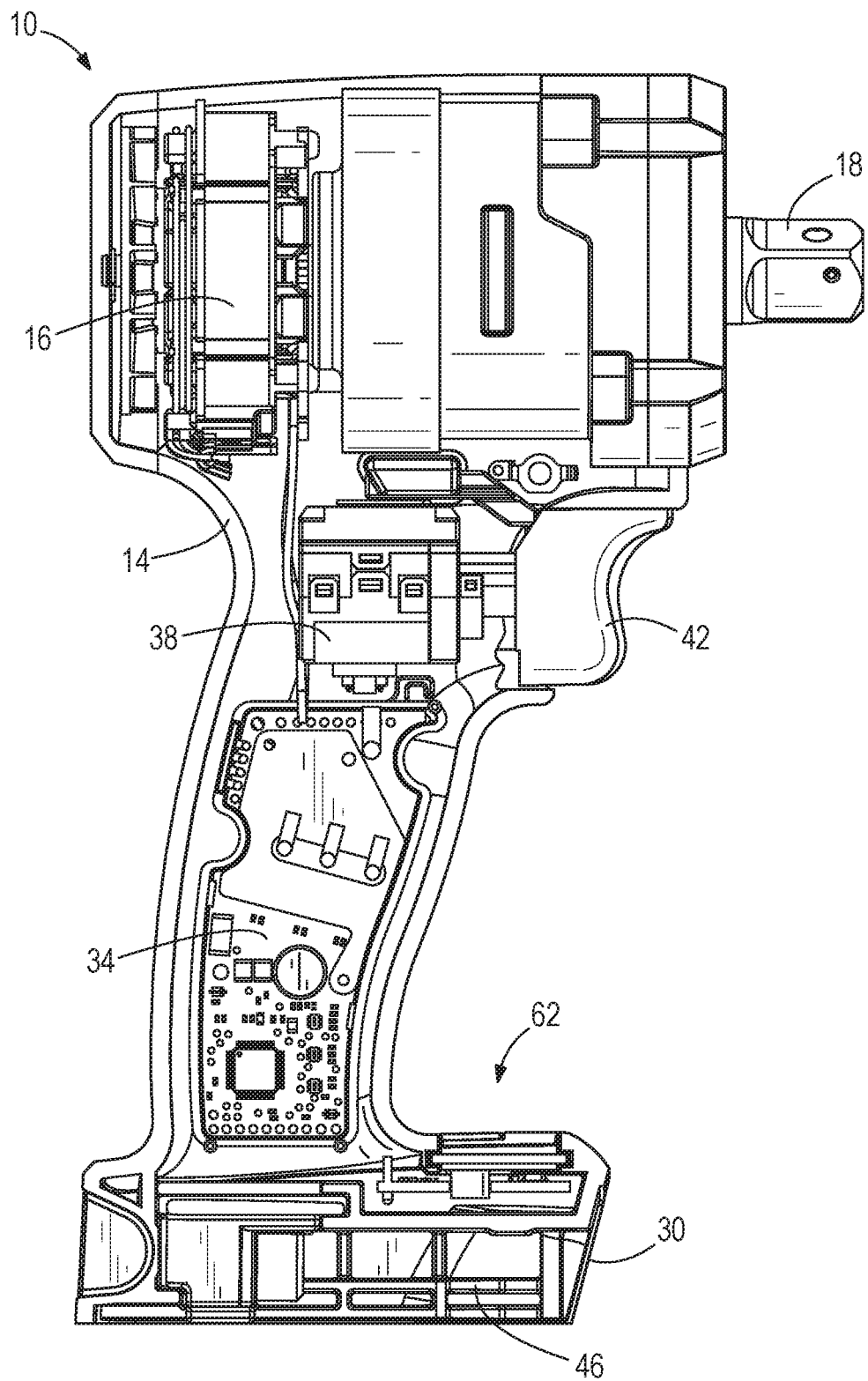
FIG. 2 is a side, partial cutaway view of the rotary power tool of FIG. 1.

With reference to FIGS. 1 and 2, a rotary power tool, such as a rotary impact wrench 10, includes a housing 14, an electric motor 16 positioned within the housing 14 (FIG. 2), and an output shaft 18 protruding from the housing 14 that receives torque from the electric motor 16, causing the output shaft 18 to rotate. The illustrated rotary impact wrench 10 is configured to deliver discrete rotational impacts upon fasteners (e.g., bolts, via a socket) for tightening or loosening the fasteners.

The illustrated housing 14 includes a motor housing portion 22 in which the motor 16 is supported, a handle portion 26 extending from the bottom of the motor housing portion 22 that is graspable by the user of the impact wrench 10 during use, and a foot portion 30 located on an opposite end of the handle portion 26 as the motor housing portion 22. With reference to FIG. 2, the impact wrench 10 also includes a controller 34 (e.g. a printed circuit board having one or more microprocessors and multiple field-effect transducers for driving the motor 16) located within the handle portion 26 of the housing 14, a trigger switch 38 electrically connected to the controller 34 for providing an input signal to the controller 34 to activate and deactivate the motor 16 in response to actuation of the trigger switch 38, and a trigger 42 protruding from the handle portion 26 that is depressible by the user to actuate the trigger switch 38.

With continued reference to FIG. 2, a battery receptacle 46 is defined in the foot portion 30 in which a battery pack (not shown) is detachably received to provide electrical power to the controller 34 and the motor 16, when activated.

Figure 3:
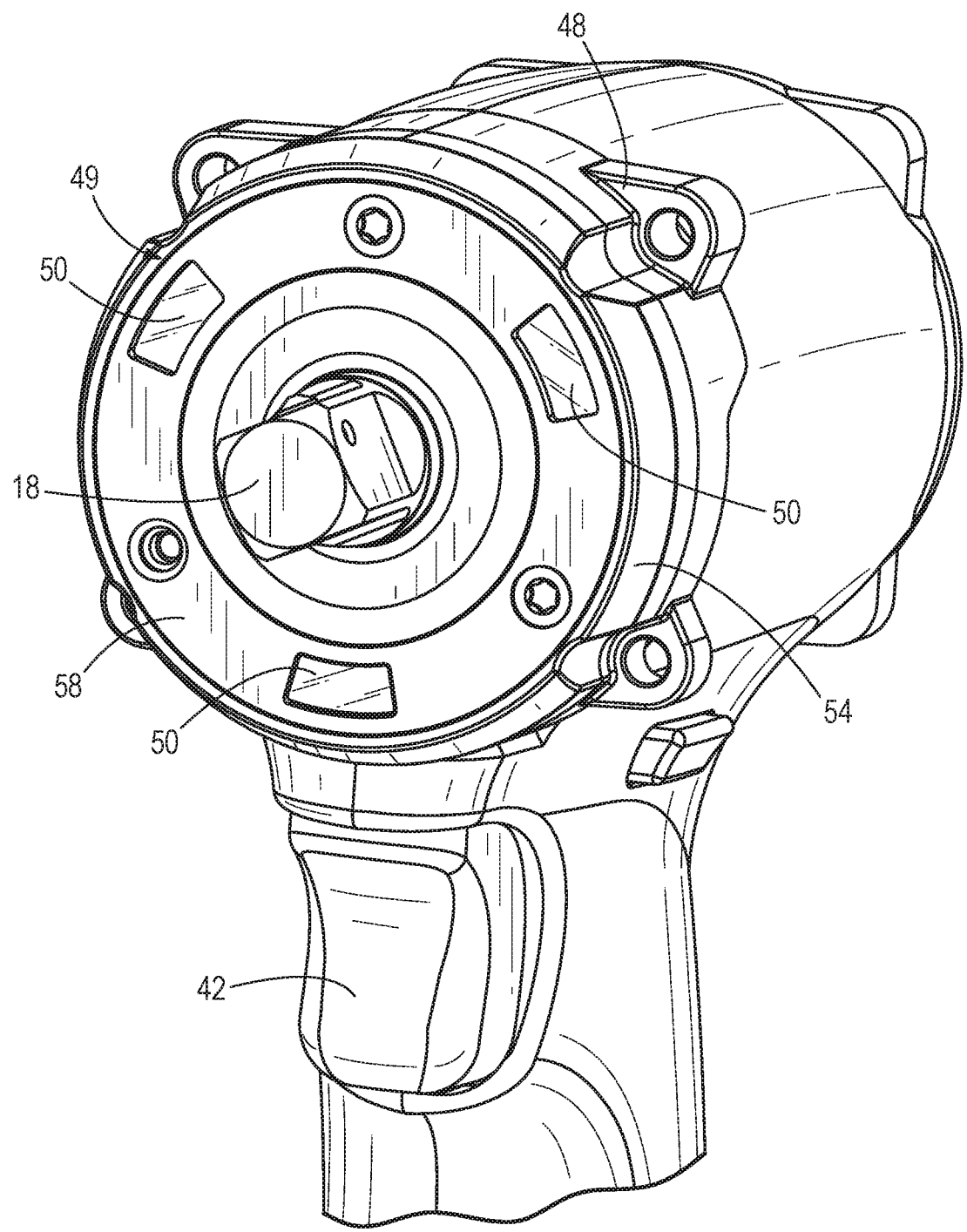
FIG. 3 is a perspective view of a work light of the rotary power tool of FIG. 1.

With reference to FIG. 3, the impact wrench 10 further includes a work light 49 located at the front of the motor housing portion 22 for illuminating a work area in front of the output shaft 18. In the illustrated embodiment, the work light 49 includes an annular cover 54, which partially surrounds an outer periphery of an impact case 48 (which houses a rotary impact mechanism, not shown, between the motor 16 and the output shaft 18), a plurality of lighting elements 50 (e.g. light emitting diodes, or LEDs) radially positioned around the output shaft 18 and supported by the cover 54, and a retaining ring 58 clamping the cover 54 to the impact case 48.

Figure 4:
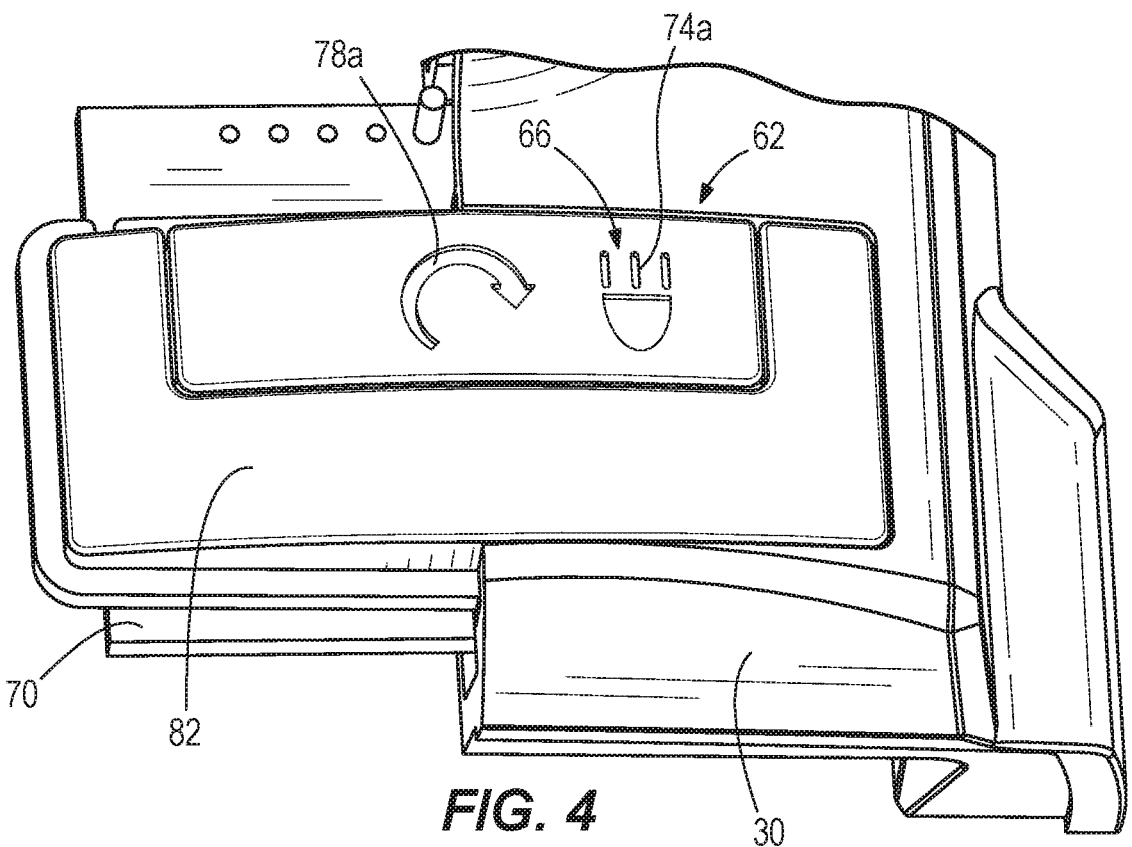
FIG. 4 is a perspective view of a control panel of the rotary power tool of FIG. 1.

With reference to FIGS. 1, 2, and 4, the impact wrench 10 further includes a control panel 62 positioned at the top of the foot portion 30 for controlling the operation of the wrench 10. More specifically, the control panel 62 includes a brightness control unit 66 including a printed circuit board or PCB 70 supported within the foot portion 30 and a light switch, such as a brightness control switch 74 (FIG. 5), mounted to the PCB 70. The PCB 70 is electrically connected with the controller 34 by electrical wires (not shown). Accordingly, the PCB 70 is operable to transfer current between the brightness control switch 74 and the controller 34, such that the brightness control unit 66 is operable to provide a signal to the controller 34 about a user-selected brightness state of the lighting elements 50.

The brightness control unit 66 is configured to adjust the lighting elements 50 between a plurality of different brightness states. In the illustrated embodiment, the brightness control unit 66 is programmed to adjust the lighting elements 50 between four different brightness states, including: a first, maximum brightness state, a second brightness state having a lower luminosity than the maximum brightness state, a third brightness state having a lower luminosity than the second brightness state, and an off state. If the user selects the "off" state, the lighting elements 50 remain deactivated upon the actuation of the trigger switch 20, until the user selects a different brightness state using the brightness control unit 66. Other brightness states could include, for example, a "strobe" state in which the lighting elements 50 flash between an illuminated state and an off state, or "constant on" state where a timer that may otherwise be used for deactivating the lighting elements 50 in response to the user releasing the trigger 42 is temporarily disabled to allow the work light 49 to be used as a flashlight. Alternatively, rather than adjusting the brightness or luminosity of the lighting elements 50, the switch 74 may be configured to adjust a timer intended to maintain the lighting elements 50 illuminated after release of the trigger 42 (and deactivation of the motor 16) to a plurality of different expiration times. Furthermore, this additional functionality could be provided by a separate switch (not shown) mounted to the PCB, in addition to the brightness control switch 74.

In the illustrated embodiment of the brightness control unit 66, the brightness control switch 74 is configured as a momentary switch, and the lighting elements 50 are adjusted to different brightness states in response to consecutive actuations of the switch 74. In other words, four consecutive depressions of the brightness control switch 74 will cycle the lighting elements 50 between the four abovementioned brightness states. Alternatively, the brightness control switch 74 could be a slide or wheel potentiometer for cycling the lighting elements 50 between the four abovementioned brightness states.

Figure 5:
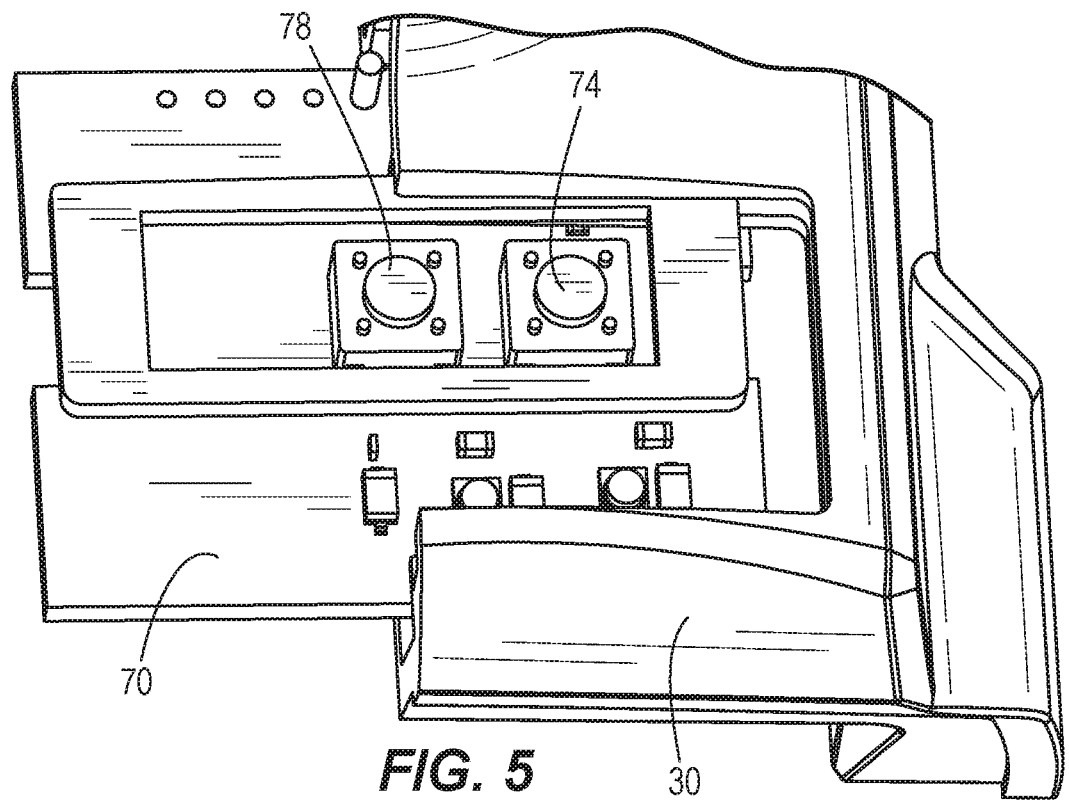
FIG. 5 is perspective, partial cutaway view of the control panel of FIG. 4.

With reference to FIG. 5, the control panel 62 also includes a mode selection switch 78 mounted to the PCB 70 configured to adjust the wrench 10 between a plurality of different operational modes. For example, the mode selection switch 78 may be operable to adjust the rotational speed of the output shaft 18 (when unloaded). In other embodiments of the control panel 62, the mode selection switch 78 may be omitted, leaving only the brightness control switch 74 mounted to the PCB 70. Also, in the illustrated embodiment shown in FIG. 4, the control panel 62 includes a flexible membrane or cover 82 overlying the switches 74, 78. The cover 82 includes selection regions 74a, 78a, indicated by respective icons, above the respective switches 74, 78. As such, the cover 82 flexes in response to the user depressing either of the selection regions 74a, 78a, thereby actuating the underlying switches 74, 78. Alternatively, the cover 82 may be omitted, and individual buttons (not shown) associated with the respective switches 74, 78 may protrude from the top surface of the foot portion 30.

Various features of the invention are set forth in the following claims.

What is claimed is:

1. A rotary power tool comprising:
 a housing including a motor housing portion and a handle portion extending from the housing;
 an electric motor disposed within the motor housing portion;
 a trigger switch configured to selectively activate the electric motor;
 a plurality of lighting elements configured to be activated in response to actuation of the trigger switch;
 a controller positioned in the housing and configured to activate the lighting elements in response to actuation of the trigger switch; and
 a brightness control unit positioned on the housing, the brightness control unit including
  a light switch in electrical communication with the controller, and
  a circuit board upon which the light switch is mounted, the circuit board being electrically connected to the controller to direct electrical current between the circuit board and the controller, and
  wherein the brightness control unit is configured to adjust the lighting elements between a plurality of different brightness states other than an "ON" state or an "OFF" state.

2. The rotary power tool of claim 1, wherein the brightness control unit is also configured to adjust the lighting elements to the "OFF" state, such that the lighting elements remain deactivated in response to actuation of the trigger switch.

3. The rotary power tool of claim 1, wherein the light switch is configured to adjust the brightness state of the lighting elements in response to being actuated.

4. The rotary power tool of claim 3, wherein the light switch is a momentary switch, and wherein the lighting elements are adjusted to different brightness states in response to consecutive actuations of the light switch.

5. The rotary power tool of claim 1, wherein the light switch is a first switch, and wherein the rotary power tool further comprises a second switch mounted to the circuit board that is configured to adjust an operational mode of the motor.

6. The rotary power tool of claim 1, wherein the housing includes a foot portion on an opposite end of the handle portion as the motor housing portion, and wherein the brightness control unit is positioned on the foot portion of the housing.

7. The rotary power tool of claim 1, wherein the brightness control unit is operable separately from the actuation of the trigger switch.

8. The rotary power tool of claim 1, wherein the different brightness states have a different luminosity from each other.

9. The rotary power tool of claim 1, wherein at least one of the brightness states has a different duration of illumination than the other brightness states.

10. A rotary power tool comprising:
a housing including a motor housing portion and a handle portion extending from the housing;
an electric motor disposed within the motor housing portion;
a trigger switch configured to selectively activate the electric motor;
a plurality of lighting elements;
a controller positioned in the housing and configured to activate the lighting elements in response to actuation of the trigger switch; and
a control unit positioned on the housing, the control unit including
a light switch configured as a first switch, the light switch being mounted to a circuit board in electrical communication with the controller,
a timer configured to be adjusted by the light switch to a plurality of different expiration times after which the lighting elements are deactivated following release of the trigger switch; and
a second switch mounted to the circuit board that is configured to adjust an operational mode of the motor.

11. The rotary power tool of claim 10, wherein the timer is configured to be temporarily disabled by the light switch to allow the lighting elements to remain indefinitely activated following release of the trigger switch.

12. The rotary power tool of claim 10, wherein the light switch is a momentary switch, and wherein the timer is adjustable to different durations in response to consecutive actuations of the light switch.

13. The rotary power tool of claim 10, wherein the light switch is a slide switch or a wheel potentiometer.

14. A rotary power tool comprising:
a housing including a motor housing portion and a handle portion extending from the housing;
an electric motor disposed within the motor housing portion;
an output shaft extending from the housing configured to receive torque from the electric motor, causing the output shaft to rotate;
a trigger switch configured to selectively activate the electric motor;
a plurality of lighting elements radially positioned around the output shaft;
a controller positioned in the housing and configured to activate the lighting elements in response to actuation of the trigger switch; and
a brightness control unit positioned on the housing, the brightness control unit including
a light switch in electrical communication with the controller to adjust the brightness or luminosity of the lighting elements in response to being actuated,
a circuit board upon which the light switch is mounted that is electrically connected to the controller to direct electrical current between the circuit board and the controller, and
wherein the brightness control unit is configured to adjust the lighting elements between a plurality of different brightness states other than an "ON" and an "OFF" state,
wherein the housing includes a foot portion on an opposite end of the handle portion as the motor housing portion, and wherein the brightness control unit is positioned on the foot portion of the housing.

15. The rotary power tool of claim 14, wherein the light switch is a first switch, and wherein the rotary power tool further comprises a second switch mounted to the circuit board that is configured to adjust an operational mode of the motor.

* * * * *